(12) United States Patent
Yang et al.

(10) Patent No.: US 12,129,344 B2
(45) Date of Patent: *Oct. 29, 2024

(54) POLYESTER FILM AND METHOD FOR PRODUCING THE SAME

(71) Applicant: NAN YA PLASTICS CORPORATION, Taipei (TW)

(72) Inventors: Wen-Cheng Yang, Taipei (TW); Te-Chao Liao, Taipei (TW); Chun-Cheng Yang, Taipei (TW); Chia-Yen Hsiao, Taipei (TW); Ching-Yao Yuan, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 154 days.

This patent is subject to a terminal disclaimer.

(21) Appl. No.: 17/408,507

(22) Filed: Aug. 23, 2021

(65) Prior Publication Data

US 2022/0243032 A1      Aug. 4, 2022

(30) Foreign Application Priority Data

Jan. 29, 2021   (TW) ................. 110103415

(51) Int. Cl.
  *C08J 11/10*   (2006.01)
  *B29B 17/04*   (2006.01)
  (Continued)

(52) U.S. Cl.
  CPC ........... *C08J 11/10* (2013.01); *B29B 17/0412* (2013.01); *B29C 48/022* (2019.02); *B29C 48/08* (2019.02);
  (Continued)

(58) Field of Classification Search
  CPC .......... B29B 17/0412; B29B 2017/042; B29C 48/022; B29C 48/08; B29K 2105/26;
  (Continued)

(56) References Cited

U.S. PATENT DOCUMENTS

| 5,451,611 A * | 9/1995 | Chilukuri ................. C08J 11/24 521/48.5 |
|---|---|---|
| 2004/0130059 A1 | 7/2004 | Kern et al. |

(Continued)

FOREIGN PATENT DOCUMENTS

| CN | 1806000 | 7/2006 |
|---|---|---|
| CN | 106117528 | 11/2016 |

(Continued)

OTHER PUBLICATIONS

Machine translation of JP 2011-256328, Nakamachi, Dec. 22, 2011 (Year: 2011).*

(Continued)

*Primary Examiner* — Frances Tischler
(74) *Attorney, Agent, or Firm* — JCIPRNET

(57) ABSTRACT

A polyester film and a method for producing the same are provided. The polyester film includes a physically recycled polyester resin and a chemically recycled polyester resin. The physically recycled polyester resin is formed of physically recycled polyester chips, and the physically recycled polyester chips have a first intrinsic viscosity. The chemically recycled polyester resin is formed of chemically recycled polyester chips, and the chemically recycled polyester chips have a second intrinsic viscosity. The second intrinsic viscosity is less than the first intrinsic viscosity. The physically recycled polyester chips and the chemically recycled polyester chips are mixed with each other and melt extruded according to a predetermined intrinsic viscosity, so that the polyester film has the predetermined intrinsic viscosity.

10 Claims, 4 Drawing Sheets

(51) Int. Cl.
  *B29C 48/00* (2019.01)
  *B29C 48/08* (2019.01)
  *B29K 67/00* (2006.01)
  *B29K 105/00* (2006.01)
  *B29K 105/26* (2006.01)
  *C08J 5/18* (2006.01)
  *C08J 11/06* (2006.01)
  *C08L 67/02* (2006.01)

(52) U.S. Cl.
  CPC .............. *C08J 5/18* (2013.01); *C08J 11/06* (2013.01); *C08L 67/02* (2013.01); *B29B 2017/042* (2013.01); *B29K 2067/00* (2013.01); *B29K 2105/0094* (2013.01); *B29K 2105/26* (2013.01); *B29K 2995/0026* (2013.01); *B29K 2995/0046* (2013.01); *B29K 2995/0072* (2013.01); *C08J 2367/02* (2013.01); *C08J 2467/02* (2013.01); *C08L 2205/025* (2013.01); *C08L 2207/20* (2013.01)

(58) Field of Classification Search
  CPC ........ B29K 2067/00; B29K 2105/0094; B29K 2995/0026; B29K 2995/0046; B29K 2995/0072; C08J 11/06; C08J 11/10; C08J 2367/02; C08J 2467/02; C08J 5/18; C08J 2300/30; C08J 2400/30; C08L 2205/025; C08L 2207/20; C08L 67/02; Y02W 30/62
  See application file for complete search history.

(56) References Cited

U.S. PATENT DOCUMENTS

| | | | |
|---|---|---|---|
| 2011/0054090 A1* | 3/2011 | Fujita | C08K 5/49 524/121 |
| 2012/0070615 A1* | 3/2012 | Shi | B29C 48/57 528/308.2 |
| 2019/0061400 A1 | 2/2019 | Maeba et al. | |

FOREIGN PATENT DOCUMENTS

| | | |
|---|---|---|
| CN | 110845723 | 2/2020 |
| CN | 111566148 | 8/2020 |
| EP | 1418195 | 5/2004 |
| EP | 3778743 | 2/2021 |
| JP | H01259041 | 10/1989 |
| JP | 2007160933 | 6/2007 |
| JP | 2011256328 | 12/2011 |
| JP | 2012094621 | 5/2012 |
| JP | 2012188631 | 10/2012 |
| JP | 2014185243 | 10/2014 |
| JP | 2015028962 | 2/2015 |
| JP | 2015052038 | 3/2015 |
| JP | 2015108081 | 6/2015 |
| JP | 2021031668 | 3/2021 |
| TW | 201324816 | 6/2013 |
| TW | 202024198 | 7/2020 |
| WO | 2015016111 | 2/2015 |

OTHER PUBLICATIONS

Heather Caliendo, "Researchers Combine Mechanical and Chemical Recycling", Plastics Technology, Nov. 18, 2020, pp. 1-4.
"ASTM D1894 Standard Test Method for Static and Kinetic Coefficients of Friction of Plastic Film and Sheeting", ASTM International Designation: D1894-14, Jan. 1, 2014, pp. 479-485.
Maron Samuel H. et al., "A New Method for Determination of Intrinsic Viscosity", Journal of Polymer Science: Part A-2, Jan. 1, 1969, pp. 309-324.
"Paper and board. Determination of roughness/smoothness (air leak methods)—Part 4: Print-surf method", Deutsche Normen. Din Norm, vol. DIN-ISO-8791-4, July, 1, 1996, pp. 351-360. For English version thereof, see URL: https://www.sis.se/api/document/preview/909310/.
"Search Report of Europe Counterpart Application", issued on Feb. 11, 2022, p. 1-p. 10.
"Notice of Reasons for Refusal of Japan Counterpart Application", issued on Sep. 13, 2022, p. 1-p. 4.
"Office Action of China Counterpart Application", issued on Feb. 9, 2024, p. 1-p. 13.

* cited by examiner

POLYESTER FILM AND METHOD FOR PRODUCING THE SAME

CROSS-REFERENCE TO RELATED APPLICATION

This application claims the priority benefit of Taiwan application serial no. 110103415, filed on 29 Jan. 2021. The entirety of the above-mentioned patent application is hereby incorporated by reference herein and made a part of this specification.

BACKGROUND

Technical Field

The disclosure relates to a polyester film and a method for producing the same, particularly to a polyester film using both a physically recycled polyester resin and a chemically recycled polyester resin, and a method for producing the same.

Related Art

The most common conventional methods for recycling waste polyethylene terephthalate (PET) bottles include a physical recycling method (also called a mechanical recycling method). The physical recycling method mainly includes the following. Firstly, PET bottle waste is physically and mechanically crushed. Next, the crushed PET bottle waste is placed in a high temperature environment for melting. Next, the molten PET bottle waste is subjected to granulation to form physically recycled polyester chips. These physically recycled polyester chips may be used in subsequent processing operations.

The physically recycled polyester chips produced by the physical recycling method usually have a relatively high intrinsic viscosity (IV). To adjust the intrinsic viscosity of the physically recycled polyester chips, a method mainly used in the related art is solid state polymerization. However, the solid state polymerization method may only be used to increase the intrinsic viscosity of the physically recycled polyester chips, and may not be used to reduce the intrinsic viscosity of the physically recycled polyester chips. In addition, in a general film making process, the intrinsic viscosity of polyester chips is usually limited within a certain range. The physically recycled polyester chips produced by the physical recycling method are usually only applicable to bottle blowing processes and spinning processes, and are not applicable to film making processes.

In order to adapt the physically recycled polyester chips for use in the film making process, a method mainly used in the related art is to reduce the overall intrinsic viscosity of the polyester material by mixing the physically recycled polyester chips with additional virgin polyester chips. However, such a method is unable to effectively increase the proportion of a recycled polyester material used in a polyester film, and thus, a final polyester film product may not meet the demand for environmental protection. That is, in the existing polyester films, the proportion of recycled polyester is limited to a certain extent, and this issue needs to be addressed.

SUMMARY

The disclosure provides a method for producing a polyester film

A method for producing a polyester film includes the following steps. A recycled polyester material is provided. A physical reproduction operation is performed which includes physically reproducing one part of the recycled polyester material, and subjecting the one part of the recycled polyester material to granulation to obtain physically recycled polyester chips. The physically recycled polyester chips have a first intrinsic viscosity. A chemical reproduction operation is performed which includes chemically reproducing another part of the recycled polyester material, and subjecting the another part of the recycled polyester material to granulation to obtain chemically recycled polyester chips. The chemically recycled polyester chips have a second intrinsic viscosity, and the second intrinsic viscosity is less than the first intrinsic viscosity. The physically recycled polyester chips and the chemically recycled polyester chips are mixed with each other according to a predetermined intrinsic viscosity. The physically recycled polyester chips and the chemically recycled polyester chips that are mixed with each other are melt extruded, thereby forming a polyester film. The polyester film has the predetermined intrinsic viscosity. The predetermined intrinsic viscosity of the polyester film is 0.45 dL/g to 0.75 dL/g. The polyester film has an acid value of 10 mgKOH/g to 80 mgKOH/g, a surface roughness (Ra) of 1 nanometer (nm) to 100 nm, and a friction coefficient of 0.2 to 0.6.

A polyester film is formed by mixing, melting and extruding a physically recycled polyester resin and a chemically recycled polyester resin according to a predetermined intrinsic viscosity, so that the polyester film has the predetermined intrinsic viscosity. The predetermined intrinsic viscosity of the polyester film is 0.45 dL/g to 0.75 dL/g. The polyester film has an acid value of 10 mgKOH/g to 80 mgKOH/g, a surface roughness of 1 nm to 100 nm, and a friction coefficient of 0.2 to 0.6.

In some embodiments, the content of isophthalic acid in the polyester film is 0.5 mol % to 5 mol % based on a total amount of 100 mol % of the polyester film. A storage modulus of the polyester film measured at 150±2° C. and 10 Hz is $4.0 \times 10^9$ dyne/cm$^2$ to $6.5 \times 10^9$ dyne/cm$^2$.

In some embodiments, the polyester film has a haze of not more than 5%.

In some embodiments, the content of biomass-derived ethylene glycol in the polyester film is not more than 5 wt % based on a total amount of 100 wt % of the polyester film.

In order to solve the above technical problem, one technical solution adopted by the disclosure is to provide a polyester film. An embodiment provides a polyester film. The polyester film has a predetermined intrinsic viscosity of 0.45 dL/g to 0.75 dL/g, an acid value of 10 mgKOH/g to 80 mgKOH/g, a surface roughness of 1 nm to 100 nm, and a friction coefficient of 0.2 to 0.6.

In some embodiments, the content of isophthalic acid in the polyester film is 0.5 mol % to 5 mol % based on a total amount of 100 mol % of the polyester film. A storage modulus of the polyester film measured at 150±2° C. and 10 Hz is $4.0 \times 10^9$ dyne/cm$^2$ to $6.5 \times 10^9$ dyne/cm$^2$.

In some embodiments, the polyester film has a haze of not more than 5%.

In some embodiments, the content of biomass-derived ethylene glycol in the polyester film is not more than 5 wt % based on a total amount of 100 wt % of the polyester film.

The features and technical content of the disclosure will become apparent from the detailed description and drawings

DESCRIPTION OF THE EMBODIMENTS

Implementations of the disclosure are described below by way of specific embodiments. The disclosure will become apparent to those skilled in the art from the content disclosed in this specification. The disclosure may be implemented or applied through other different specific embodiments. The details of this specification may be modified or changed in various ways without departing from the spirit of the disclosure base on different perspectives and applications. In addition, it is to be noted that the drawings of the disclosure are schematic illustrations and are not drawn according to actual dimensions. The following description will further detail the technical content of the disclosure. However, the content disclosed herein is not intended to limit the protection scope of the disclosure.

It will be understood that, although terms such as "first", "second", and "third" may be used herein to describe various elements or signals, these elements or signals should not be limited by these terms. These terms are mainly used to distinguish one element from another or one signal from another. Also, the term "or" as mentioned herein may include any and all combinations of one or more of the associated listed items, depending on the actual situation.

[Method for Producing Polyester Film]

The disclosure increases the proportion of a recycled polyester material used in a polyester film, thereby enabling a polyester film product to meet the demand for environmental protection.

Figure 1:
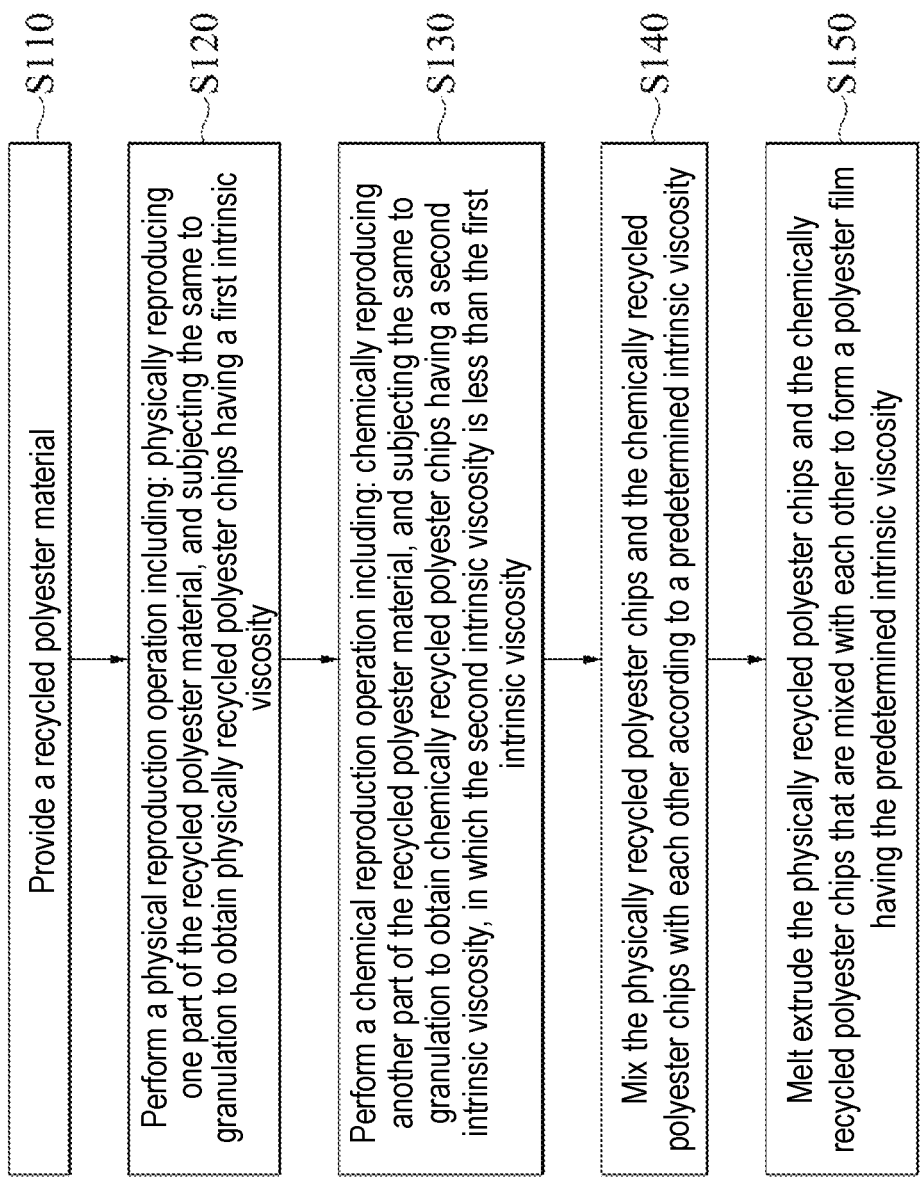
FIG. 1 is a schematic flowchart of a method for producing a polyester film according to an embodiment of the disclosure.

Referring to FIG. 1, according to an embodiment of the disclosure, a method for producing a polyester film is provided, by which the proportion of a recycled polyester material used in a polyester film may be effectively increased and a polyester film thus produced has good processability. The method for producing a polyester film includes step S110 to step S150. It is to be noted that the order of the steps described in the present embodiment and the actual operation method may be adjusted according to needs and are not limited to those described in the present embodiment.

Step S110 includes providing a recycled polyester material.

In order to obtain a reusable recycled polyester material, a method for recycling a polyester material includes: collecting various types of polyester wastes; and classifying the polyester wastes according to their type, color, and use. Next, the polyester wastes are compressed and packed. Next, the packed polyester wastes are transported to a waste treatment plant. In the present embodiment, the polyester wastes are recycled PET bottles. However, the disclosure is not limited thereto.

The method for recycling a polyester material further includes: removing other objects (for example, bottle caps, labels, and adhesives) on the polyester wastes. Next, the polyester wastes are physically and mechanically crushed. Next, the bottle caps, liners, and bottle bodies of different materials are separated by flotation. Next, the crushed polyester wastes are dried to obtain a processed recycled polyester material such as recycled PET (r-PET) bottle flakes, thereby facilitating a subsequent film production process.

It is worth mentioning that, in other modified embodiments of the disclosure, the recycled polyester material may be, for example, a processed recycled polyester material obtained by direct purchase.

It is to be noted that the terms "polyester" and "polyester material" as mentioned herein refer to any type of polyester, particularly an aromatic polyester, and here particularly refer to a polyester derived from terephthalic acid and ethylene glycol, that is, polyethylene terephthalate (PET).

Furthermore, the polyester may also be, for example, polytrimethylene terephthalate (PTT), polybutylene terephthalate (PBT), or polyethylene naphthalate (PET). In the present embodiment, the polyester is preferably PTT and PBT. In addition, a copolymer may also be used. The copolymer particularly refers to a copolymer that may be obtained from two or more dicarboxylic acids and/or two or more glycol components.

Step S120 includes: performing a physical reproduction operation including: physically reproducing one part of the recycled polyester material, and subjecting the same to granulation to obtain physically recycled polyester chips. The physically recycled polyester chips have a first intrinsic viscosity.

More specifically, the physical reproduction operation includes: physically and mechanically crushing one part of the recycled polyester material (for example, r-PET bottle flakes), so as to reduce time and energy consumption required for melting the recycled polyester material. Next, the crushed recycled polyester material is subjected to melting so that the recycled polyester material is in a molten state. Next, the recycled polyester material in the molten state is filtered by a first screen to remove solid impurities from the recycled polyester material. Finally, the recycled polyester material after filtration is subjected to extrusion and granulation to form the physically recycled polyester chips.

That is, the recycled polyester material is reshaped by cutting, melting, filtration, and extrusion in sequence. Thus, polyester molecules in the original recycled polyester material are rearranged, and multiple physically recycled polyester chips are produced.

It is worth mentioning that, during the physical reproduction, the polyester molecules of the recycled polyester material are only rearranged, not reorganized. Therefore, components (for example, a metal catalyst, a slipping agent, or a copolymerized monomer) originally present in the original recycled polyester material are still present in the physically recycled polyester material, and thus, a polyester film as a final product also includes the above components. Furthermore, the characteristics of the recycled polyester material itself are also retained in the physically recycled polyester chips.

Since the recycled polyester material does not change much in molecular weight during the physical reproduction, the recycled polyester material in the molten state has relatively high viscosity and relatively poor flow properties. Accordingly, when a screen having a too small mesh size is used, filtration efficiency is likely to be reduced.

In order to improve filtration, in the present embodiment, the first screen preferably has a mesh size of 10 μm to 100 μm. That is, the first screen is capable of filtering out solid impurities having a particle size larger than the above mesh size. However, the disclosure is not limited thereto.

Specifically, the physically recycled polyester chips produced by the physical reproduction operation usually have a relatively high intrinsic viscosity (IV). In the present embodiment, the physically recycled polyester chips have the first intrinsic viscosity, and the first intrinsic viscosity of the physically recycled polyester chips is usually not less than 0.60 dL/g, and is preferably 0.65 dL/g to 0.90 dL/g, particularly preferably 0.65 dL/g to 0.80 dL/g.

To adjust the intrinsic viscosity of the physically recycled polyester chips, a method mainly used in the related art is solid state polymerization. However, the solid state polymerization method may only be used to increase the intrinsic viscosity of the physically recycled polyester chips, and may not be used to reduce the intrinsic viscosity of the physically recycled polyester chips. In addition, in a general film making process, the intrinsic viscosity of polyester chips is usually limited within a certain range. The physically recycled polyester chips produced by the physical recycling method are usually only applicable to bottle blowing processes and spinning processes, and are not applicable to film making processes.

In order to solve the above technical problem, in the method for producing a polyester film as provided in an embodiment of the disclosure, the overall intrinsic viscosity of the recycled polyester chips may be adjusted by combining the physical recycling method with a chemical recycling method (also called a degradation polymerization recycling method). In particular, the overall intrinsic viscosity of the recycled polyester chips may be reduced so that the recycled polyester chips may be applied in a film making process. The related technical content is described as the following step S130 to step S150.

Step S130 includes: performing a chemical reproduction operation including: chemically reproducing another part of the recycled polyester material, and subjecting the same to granulation to obtain chemically recycled polyester chips. The chemically recycled polyester chips have a second intrinsic viscosity, and the second intrinsic viscosity of the chemically recycled polyester chips is less than the first intrinsic viscosity of the physically recycled polyester chips.

More specifically, the chemical reproduction operation includes: cutting or crushing another part of the recycled polyester material (for example, r-PET bottle flakes), so as to reduce time and energy consumption required for depolymerizing the recycled polyester material. Next, the cut or crushed recycled polyester material is put into a chemical depolymerization solution to depolymerize the recycled polyester material, thereby forming a raw material mixture. Next, the raw material mixture is filtered by a second screen to remove solid impurities from the recycled polyester material, thereby reducing the concentration of non-polyester impurities in the raw material mixture.

Next, the raw material mixture after filtration by the second screen is subjected to an esterification reaction, and an inorganic additive or a copolymerizable compound monomer is added during the esterification reaction. Finally, under specific reaction conditions, monomers and/or oligomers in the raw material mixture are repolymerized and subjected to granulation, so as to obtain the chemically recycled polyester chips. A liquid temperature of the chemical depolymerization solution may be, for example, 160° C. to 250° C. However, the disclosure is not limited thereto. Furthermore, a mesh size of the second screen is smaller than the mesh size of the first screen.

It is worth mentioning that the above chemical depolymerization solution may cause chain scission of polyester molecules in the recycled polyester material, thereby achieving the effect of depolymerization. Further, a polyester composition having a relatively short molecular chain and an ester monomer (for example, bis(2-hydroxyethyl) terephthalate (BHET)) composed of one diacid unit and two diol units may be obtained. That is, the raw material mixture has a smaller molecular weight than the recycled polyester material.

In the present embodiment, the chemical depolymerization solution may be, for example, a solution of water, methanol, ethanol, ethylene glycol, diethylene glycol or a combination thereof. However, the disclosure is not limited thereto. For example, water is used for hydrolysis, and methanol, ethanol, ethylene glycol, or diethylene glycol is used for alcoholysis.

In addition, it is worth mentioning that, unlike the physical reproduction operation, the chemical reproduction operation involves "depolymerization and repolymerization of the polyester molecules in the recycled polyester material" in which the polyester molecules may be depolymerized into molecules having a relatively small molecular weight and then repolymerized into a new polyester resin.

In other embodiments of the disclosure, the chemically recycled polyester chips may be prepared not only by the method described in the above embodiments, but also by a hydrolysis method or a supercritical fluid method. The hydrolysis method is performed on the recycled polyester material in an alkaline solution, in which the temperature and pressure are controlled to a certain extent and microwave radiation is applied to completely decompose the polyester molecules into monomers. The supercritical fluid method is to decompose the recycled polyester material into a small amount of monomers and oligomers in methanol in a supercritical fluid state. The yield of the monomers and oligomers is affected by reaction temperature and reaction time.

Specifically, since the chemical recycling method is capable of depolymerizing the recycled polyester material into monomers having a small molecular weight, impurities (for example, colloidal impurities or other non-polyester impurities) originally present in the recycled polyester material (for example, r-PET bottle flakes) may be filtered out more easily than in the physical recycling method.

Furthermore, since the chemical reproduction operation is capable of reducing the molecular weight of the recycled polyester material (for example, by forming a polyester composition having a relatively short molecular chain and a compound monomer), the recycled polyester material has a relatively low viscosity after being depolymerized, and is improved in flow properties. Accordingly, the chemical reproduction operation may use a screen having a relatively small mesh size to remove the impurities having a relatively small particle size from the polyester material.

In order to improve filtration, in the present embodiment, the second screen preferably has a mesh size of 1 μm to 10 μm. That is, the second screen is capable of filtering out solid impurities having a particle size larger than the above mesh size. However, the disclosure is not limited thereto.

In terms of filtering solid impurities, the physical reproduction operation may only filter out the solid impurities having a relatively large particle size in the recycled polyester material, while the chemical reproduction operation may filter out the solid impurities having a relatively small particle size in the recycled polyester material. Accordingly, production quality of the polyester film may be effectively improved.

Specifically, the chemically recycled polyester chips produced by the chemical reproduction operation usually have a relatively low intrinsic viscosity. Furthermore, the intrinsic viscosity of the chemically recycled polyester chips is relatively easily controlled, and the intrinsic viscosity of the chemically recycled polyester chips may be controlled to be lower than the intrinsic viscosity of the physically recycled polyester chips.

In the present embodiment, the chemically recycled polyester chips have the second intrinsic viscosity, and the second intrinsic viscosity of the chemically recycled polyester chips is usually not more than 0.65 dL/g, and is preferably 0.40 dL/g to 0.65 dL/g, particularly preferably 0.50 dL/g to 0.65 dL/g.

Step S140 includes: mixing the physically recycled polyester chips and the chemically recycled polyester chips with each other according to a predetermined intrinsic viscosity. The predetermined intrinsic viscosity is an intrinsic viscosity suitable for polyester film production.

More specifically, the physically recycled polyester chips and the chemically recycled polyester chips are mixed with each other in a predetermined weight ratio according to the predetermined intrinsic viscosity. Accordingly, the physically recycled polyester chips and the chemically recycled polyester chips that are mixed with each other have the predetermined intrinsic viscosity, and are thus suitable for polyester film production.

Furthermore, in the present embodiment, additional virgin polyester chips are not necessary for polyester film production. Thus, the proportion of the recycled polyester material used in the polyester film is increased. However, the disclosure is not limited thereto. For process requirements, additional virgin polyester chips may also be appropriately added in the physically recycled polyester chips and the chemically recycled polyester chips that are mixed with each other.

In the present embodiment, the predetermined intrinsic viscosity suitable for polyester film production is usually 0.45 dL/g to 0.75 dL/g, preferably 0.50 dL/g to 0.75 dL/g, and particularly preferably 0.55 dL/g to 0.65 dL/g.

In order to increase the proportion of the recycled polyester material used, each of the above various kinds of recycled polyester chips is used in an appropriate amount.

In terms of the predetermined weight ratio, based on 100 parts by weight of all the polyester chips used, the amount of the physically recycled polyester chips used is preferably 50 parts by weight to 95 parts by weight, and particularly preferably 60 parts by weight to 80 parts by weight. The amount of the chemically recycled polyester chips used is preferably 5 parts by weight to 50 parts by weight, and particularly preferably 20 parts by weight to 40 parts by weight. However, the disclosure is not limited thereto.

That is, in the present embodiment, the physically recycled polyester chips account for a large proportion and the chemically recycled polyester chips account for a small proportion in terms of the amount used. However, the disclosure is not limited thereto.

Step S150 includes: melt extruding the physically recycled polyester chips and the chemically recycled polyester chips that are mixed with each other, thereby forming a polyester film. The polyester film has the predetermined intrinsic viscosity.

In the polyester film, the physically recycled polyester chips are formed into a physically recycled polyester resin, the chemically recycled polyester chips are formed into a chemically recycled polyester resin, and the physically recycled polyester resin and the chemically recycled polyester resin are uniformly mixed with each other.

According to a mixing ratio in step S140, based on a total amount of 100 wt % of the polyester film, the content of the physically recycled polyester resin is preferably 50 wt % to 95 wt %, and particularly preferably 60 wt % to 80 wt %. The content of the chemically recycled polyester resin is preferably 5 wt % to 50 wt %, and particularly preferably 20 wt % to 40 wt %.

Furthermore, a total content of the physically recycled polyester resin and the chemically recycled polyester resin is preferably 55 wt % to 100 wt %, and particularly preferably 70 wt % to 100 wt %.

It is to be noted that "wt %" as mentioned herein is an abbreviation for percent by weight.

According to the above configuration, the method for producing a polyester film of the present embodiment may use the recycled polyester material in a high proportion, and requires no or only a small number of additional virgin polyester chips. For example, in an embodiment of the disclosure, the amount of the virgin polyester chips used is usually not more than 50 parts by weight, preferably not more than 30 parts by weight, and particularly preferably not more than 10 parts by weight.

In an embodiment of the disclosure, the physically recycled polyester chips have a first acid value, the chemically recycled polyester chips have a second acid value, and the second acid value is greater than the first acid value. The first acid value is 10 mgKOH/g to 40 mgKOH/g, and the second acid value is 20 mgKOH/g and 70 mgKOH/g.

Figure 2:
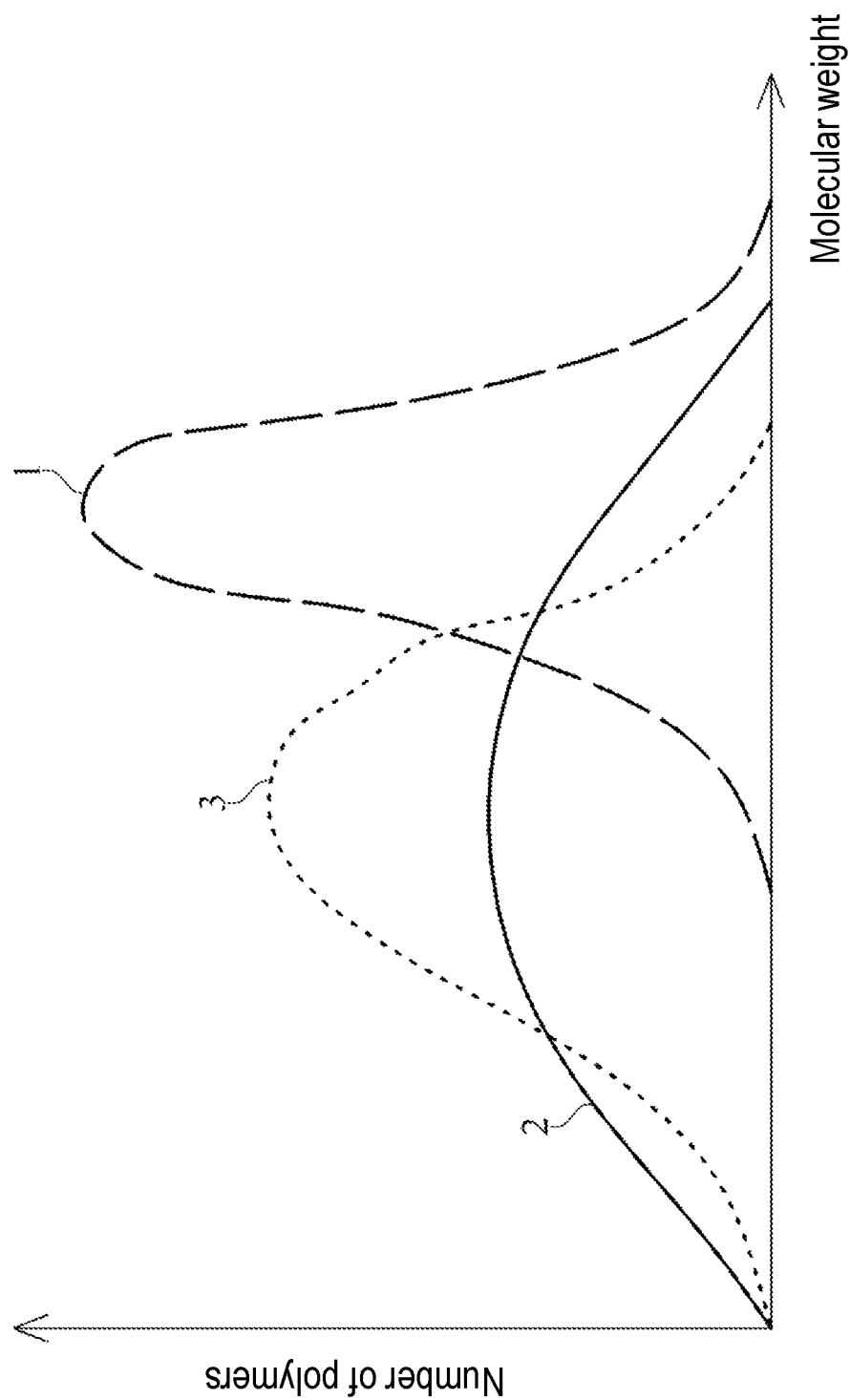
FIG. 2 is a schematic diagram of molecular weight distributions of different polyester chip materials according to an embodiment of the disclosure.

Specifically, referring to FIG. 2, the physically recycled polyester chips have a first molecular weight distribution 1, the chemically recycled polyester chips have a second molecular weight distribution 2, and the second molecular weight distribution 2 has a wider range than the first molecular weight distribution 1.

By a combination of the first molecular weight distribution 1 of the physically recycled polyester chips and the second molecular weight distribution 2 of the chemically recycled polyester chips, the physically recycled polyester chips and the chemically recycled polyester chips that are mixed with each other have, as a whole, a third molecular weight distribution 3 whose range is between the ranges of the first molecular weight distribution 1 and the second molecular weight distribution 2.

Specifically, in terms of molecular weight distribution, the chemically recycled polyester chips have a relatively wide molecular weight distribution, and may improve productivity of the film making process. However, a polyester film produced by only using the chemically recycled polyester chips may have relatively poor physical properties (for example, mechanical properties). Furthermore, the production cost of the chemically recycled polyester chips is relatively high.

The physically recycled polyester chips have a relatively narrow molecular weight distribution, and may reduce productivity of the film making process. However, a polyester film produced by only using the physically recycled polyester chips may have relatively good physical properties.

That is, neither a pure physical recycling method and nor a pure chemical recycling method is satisfactory.

The method for producing a polyester film of an embodiment of the disclosure is characterized in that, by combining the physically recycled polyester chips with the chemically recycled polyester chips, the productivity of the film making process is improved and the polyester film has relatively good physical properties.

That is, the polyester film produced by the physical reproduction operation in combination with the chemical reproduction operation is improved in quality compared to the polyester film produced only by the physical reproduction operation or only by the chemical reproduction operation.

Specifically, the method for producing a polyester film further includes adding inorganic particles to the recycled polyester material in the physical reproduction operation or in the chemical reproduction operation, so that the polyester film as a final product contains the inorganic particles.

In the present embodiment, the inorganic particles are a slipping agent. However, the disclosure is not limited thereto. The slipping agent is at least one material selected from the group consisting of silicon dioxide particles, calcium carbonate particles, barium sulfate particles, polystyrene particles, silicone particles, and acrylic particles. Furthermore, based on the total amount of 100 wt % of the polyester film, the content of the slipping agent is 0.01 wt % to 10 wt %.

[Polyester Film]

The method for producing a polyester film of an embodiment of the disclosure has been described as above. The polyester film of an embodiment of the disclosure will be described below. In the present embodiment, the polyester film is formed by the above production method. However, the disclosure is not limited thereto.

The polyester film includes a physically recycled polyester resin and a chemically recycled polyester resin, and the chemically recycled polyester resin and the physically recycled polyester resin are mixed with each other.

The physically recycled polyester resin is formed of physically recycled polyester chips, and the physically recycled polyester chips have a first intrinsic viscosity. The chemically recycled polyester resin is formed of chemically recycled polyester chips, and the chemically recycled polyester chips have a second intrinsic viscosity. The second intrinsic viscosity is less than the first intrinsic viscosity.

The physically recycled polyester chips and the chemically recycled polyester chips are mixed with each other in a predetermined weight ratio and melt extruded according to a predetermined intrinsic viscosity, so that the polyester film has the predetermined intrinsic viscosity.

In an embodiment of the disclosure, the first intrinsic viscosity of the physically recycled polyester chips is not less than 0.60 dL/g, the second intrinsic viscosity of the chemically recycled polyester chips is not more than 0.65 dL/g, and the predetermined intrinsic viscosity is 0.45 dL/g to 0.75 dL/g.

In an embodiment of the disclosure, the first intrinsic viscosity of the physically recycled polyester chips is 0.60 dL/g to 0.80 dL/g, the second intrinsic viscosity of the chemically recycled polyester chips is 0.50 dL/g to 0.65 dL/g, and the predetermined intrinsic viscosity is 0.60 dL/g to 0.65 dL/g.

In an embodiment of the disclosure, the polyester film has an acid value of 10 mgKOH/g to 80 mgKOH/g, and preferably of 40 mgKOH/g to 70 mgKOH/g.

The above acid value of the polyester film is measured by a titration method, tested with reference to an ASTM D7409-15 standard test method.

When the polyester film has an acid value of 10 mgKOH/g to 80 mgKOH/g, the polyester film exhibits heat resistance and hydrolysis resistance under the low acid value.

In an embodiment of the disclosure, the polyester film satisfies the following conditions.

Based on the total amount of 100 mol % (molar percentage or molar proportion) of the polyester film, the content of isophthalic acid in the polyester film is 0.5 mol % to 5 mol %. Based on the total amount of 100 wt % of the polyester film, the content of biomass-derived ethylene glycol in the polyester film is not more than 5 wt %.

The polyester film has a haze of not more than 5%, a surface roughness (Ra) of 1 nm to 100 nm, and a friction coefficient of 0.2 to 0.6.

The friction coefficient of the polyester film is measured based on ASTM D1894.

When the surface roughness of the polyester film is 1 nm to 100 nm (the surface roughness is measured based on DIN EN ISO 4287/4288), and the friction coefficient of the polyester film is 0.2 to 0.6, these parameter conditions facilitate the film making, film collection and back-end processing procedures of the polyester film.

Figure 3:
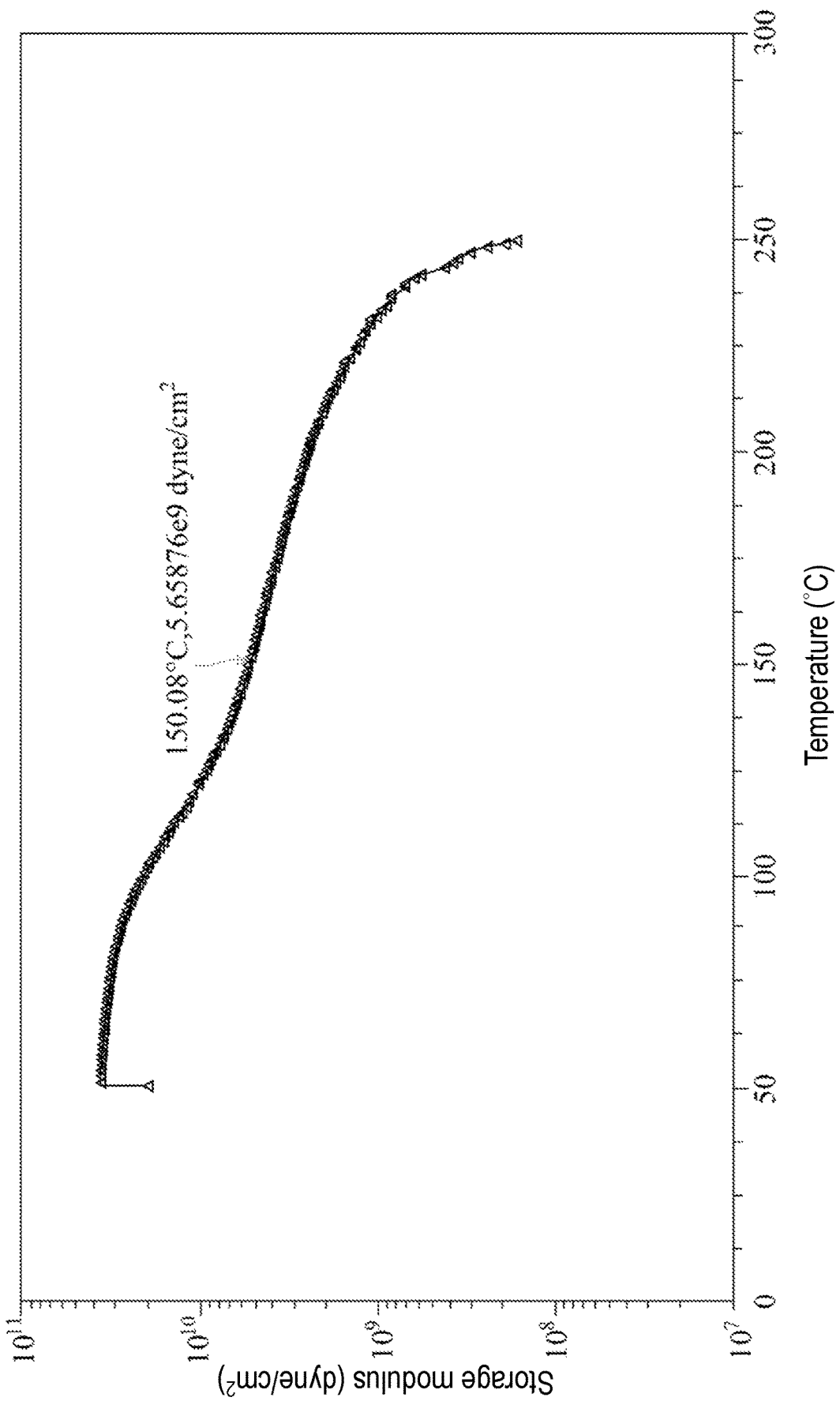
FIG. 3 shows test results of storage modulus of a polyester film according to an embodiment of the disclosure (test conditions: film thickness is 100 μm (micrometer), and the test direction is the machine direction (MD)).
Figure 4:
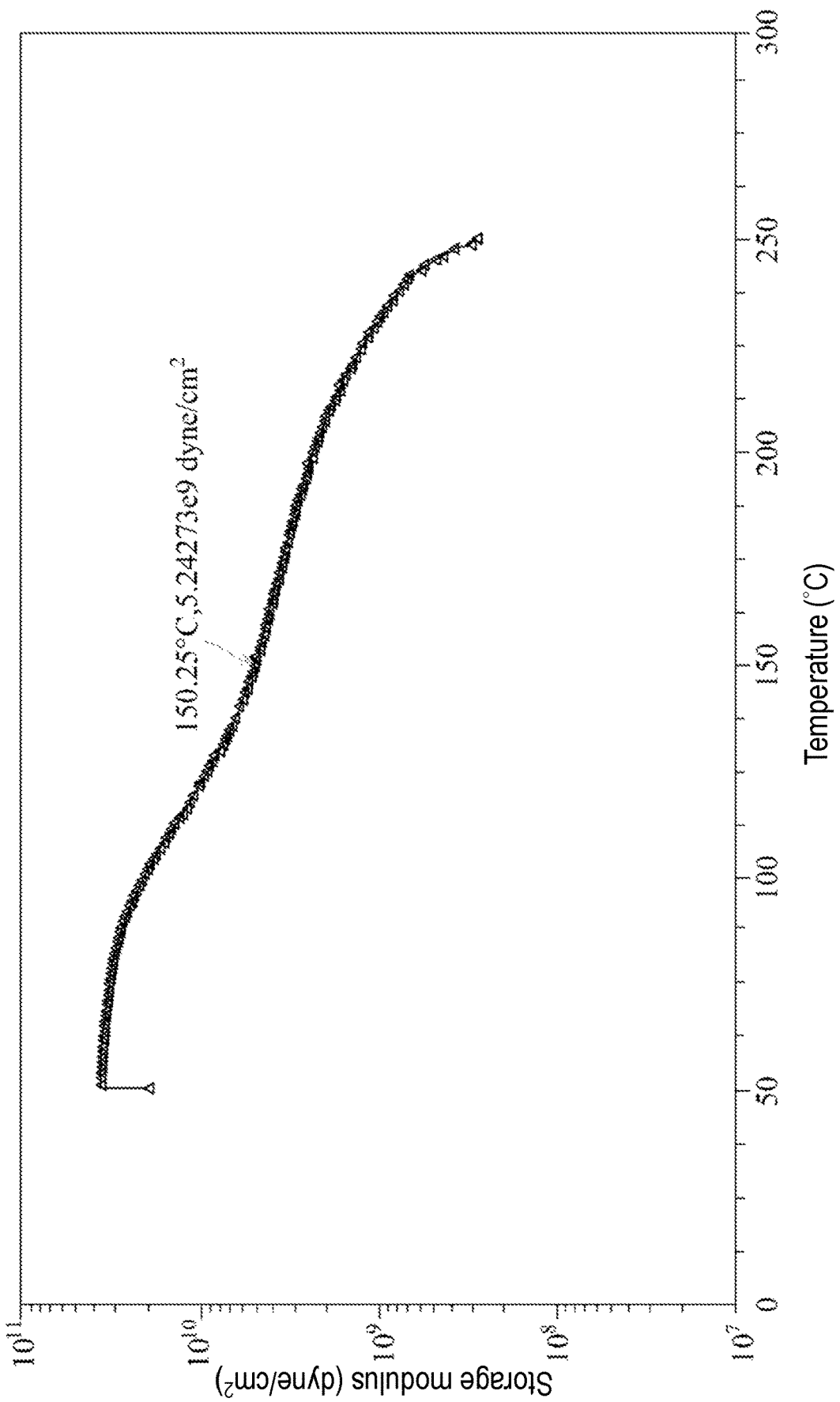
FIG. 4 shows test results of storage modulus of a polyester film according to an embodiment of the disclosure (test conditions: film thickness is 100 μm, and the test direction is the transverse direction (TD)).

In an embodiment of the disclosure, a storage modulus of the polyester film measured at 150±2° C. and 10 Hz is $4.0 \times 10^9$ dyne/cm$^2$ to $6.5 \times 10^9$ dyne/cm$^2$, and preferably $4.2 \times 10^9$ dyne/cm$^2$ to $6.0 \times 10^9$ dyne/cm$^2$. The above storage modulus of the polyester film is an average value of the storage modulus of the polyester film measured in the MD and TD by a dynamic viscoelasticity measurement device. Specific measurement results are shown in FIG. 3 and FIG. 4. However, the disclosure is not limited thereto.

In the polyester film and the method for producing the same provided by the disclosure, by the technical solution of "performing a physical reproduction operation including: physically reproducing one part of the recycled polyester material, and subjecting the one part of the recycled polyester material to granulation to obtain physically recycled polyester chips, in which the physically recycled polyester chips have a first intrinsic viscosity; performing a chemical reproduction operation including: chemically reproducing another part of the recycled polyester material, and subjecting the another part of the recycled polyester material to granulation to obtain chemically recycled polyester chips, in which the chemically recycled polyester chips have a second intrinsic viscosity, and the second intrinsic viscosity is less than the first intrinsic viscosity; mixing the physically recycled polyester chips and the chemically recycled polyester chips with each other according to a predetermined intrinsic viscosity", the overall intrinsic viscosity of the recycled polyester material may be controlled to be suitable for polyester film production. In this way, the proportion of the recycled polyester material used in the polyester film may be effectively increased, thereby enabling a final polyester film product to meet the demand for environmental protection.

The above description is only about the preferred and feasible embodiments of the disclosure and does not therefore limit the scope of the disclosure. All equivalent technical changes made from the specification and drawings of the disclosure shall fall within the scope of the disclosure.

What is claimed is:

1. A method for producing a polyester film, comprising: providing a recycled polyester material;

performing a physical operation on one part of the recycled polyester material to obtain physically recycled polyester chips, wherein the physically recycled polyester chips have a first intrinsic viscosity, and the physical operation comprising:
  physically and mechanically crushing the one part of the recycled polyester material;
  melting the crushed recycled polyester material into a molten recycled polyester material;
  filtering the molten recycled polyester material by a first screen and then forming the physically recycled polyester chips by extrusion, wherein the first screen has a mesh size of 10 μm to 100 μm;
performing a chemical operation on another part of the recycled polyester material to obtain chemically recycled polyester chips, wherein the chemically recycled polyester chips have a second intrinsic viscosity, and the second intrinsic viscosity is less than the first intrinsic viscosity, the chemical operation comprising:
  cutting or crushing the another part of the recycled polyester material, putting it into a chemical depolymerization solution to depolymerize it and forming a raw material mixture, wherein a temperature of the chemical depolymerization solution is 160° C. to 250° C., and the chemical depolymerization solution comprises water, methanol, ethanol, ethylene glycol, diethylene glycol or a combination thereof;
  filtering the raw material mixture by a second screen and then forming the chemically recycled polyester chips by an esterification reaction, wherein:
    the second screen has a mesh size of 1 μm to 10 μm, and the mesh size of the second screen is smaller than the mesh size of the first screen;
    an inorganic additive is added during the esterification reaction, wherein
      based on the total amount of 100 wt % of the polyester film, the content of the inorganic additive is 0.01 wt % to 10 wt %;
    wherein the inorganic additive is selected from a group consisting of silicon dioxide particles, calcium carbonate particles, barium sulfate particles, polystyrene particles, silicone particles, and acrylic particles; and
mixing the physically recycled polyester chips and the chemically recycled polyester chips with each other according to a predetermined intrinsic viscosity; and
melt extruding the physically recycled polyester chips and the chemically recycled polyester chips that are mixed with each other, thereby forming the polyester film having the predetermined intrinsic viscosity,
wherein the first intrinsic viscosity is 0.65 dL/g to 0.90 dL/g,
wherein the second intrinsic viscosity is 0.40 dL/g to 0.65 dL/g, and
wherein the polyester film has a haze of not more than 5%.

2. The method for producing a polyester film according to claim 1,
wherein the first intrinsic viscosity is 0.65 dL/g to 0.80 dL/g,
wherein the second intrinsic viscosity is 0.50 dL/g to 0.65 dL/g.

3. The method for producing a polyester film according to claim 1,
wherein the physically recycled polyester resin has a first molecular weight distribution,
wherein the chemically recycled polyester resin has a second molecular weight distribution, and the second molecular weight distribution has a wider range than the first molecular weight distribution.

4. The method for producing a polyester film according to claim 1,
wherein a content of isophthalic acid in the polyester film is 0.5 mol % to 5 mol % based on a total amount of 100 mol % of the polyester film,
wherein a storage modulus of the polyester film measured at 150±2° C. and 10 Hz is $4.0 \times 10^9$ dyne/cm$^2$ to $6.5 \times 10^9$ dyne/cm$^2$.

5. The method for producing a polyester film according to claim 1, wherein a content of biomass-derived ethylene glycol in the polyester film is not more than 5 wt % based on a total amount of 100 wt % of the polyester film.

6. The method for producing a polyester film according to claim 1,
wherein the predetermined intrinsic viscosity of the polyester film is 0.45 dL/g to 0.75 dL/g,
wherein an acid value of the polyester film is 10 mgKOH/g to 80 mgKOH/g,
wherein a surface roughness of the polyester film is 1 nm to 100 nm,
wherein a friction coefficient of the polyester film is 0.2 to 0.6.

7. The method for producing a polyester film according to claim 6,
wherein the predetermined intrinsic viscosity of the polyester film is 0.60 dL/g to 0.65 dL/g,
wherein an acid value of the polyester film is 40 mgKOH/g to 70 mgKOH/g.

8. The method for producing a polyester film according to claim 6,
wherein a content of isophthalic acid in the polyester film is 0.5 mol % to 5 mol % based on a total amount of 100 mol % of the polyester film,
wherein a storage modulus of the polyester film measured at 150±2° C. and 10 Hz is $4.0 \times 10^9$ dyne/cm$^2$ to $6.5 \times 10^9$ dyne/cm$^2$,
wherein the polyester film has a haze of not more than 5%,
wherein a content of biomass-derived ethylene glycol in the polyester film is not more than 5 wt % based on a total amount of 100 wt % of the polyester film.

9. The method for producing a polyester film according to claim 6,
wherein the physically recycled polyester resin has a first molecular weight distribution,
wherein the chemically recycled polyester resin has a second molecular weight distribution, and the second molecular weight distribution has a wider range than the first molecular weight distribution.

10. The method for producing a polyester film according to claim 9,
wherein the predetermined intrinsic viscosity of the polyester film is 0.60 dL/g to 0.65 dL/g,
wherein an acid value of the polyester film is 40 mgKOH/g to 70 mgKOH/g,
wherein a content of isophthalic acid in the polyester film is 0.5 mol % to 5 mol % based on a total amount of 100 mol % of the polyester film,
wherein a storage modulus of the polyester film measured at 150±2° C. and 10 Hz is $4.0 \times 10^9$ dyne/cm$^2$ to $6.5 \times 10^9$ dyne/cm$^2$,
wherein the polyester film has a haze of not more than 5%, wherein a content of biomass-derived ethylene glycol in the polyester film is not more than 5 wt % based on a total amount of 100 wt % of the polyester film.

* * * * *